(12) United States Patent
Micoud et al.

(10) Patent No.: US 12,021,282 B2
(45) Date of Patent: Jun. 25, 2024

(54) SYSTEM FOR REGENERATING A FUEL CELL AND REGENERATION METHOD

(71) Applicant: COMMISSARIAT A L'ENERGIE ATOMIQUE ET AUX ENERGIES ALTERNATIVES, Paris (FR)

(72) Inventors: Fabrice Micoud, Grenoble (FR); Arnaud Morin, Grenoble (FR); Jean-Philippe Poirot-Crouvezier, Grenoble (FR); Florent Vandenberghe, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/809,378

(22) Filed: Jun. 28, 2022

(65) Prior Publication Data
US 2023/0006228 A1   Jan. 5, 2023

(30) Foreign Application Priority Data

Jun. 30, 2021 (FR) .................................... 21 07068

(51) Int. Cl.
*H01M 8/04* (2016.01)
*H01M 8/04089* (2016.01)
*H01M 8/0656* (2016.01)

(52) U.S. Cl.
CPC ..... *H01M 8/0656* (2013.01); *H01M 8/04089* (2013.01)

(58) Field of Classification Search
CPC .................. H01M 8/0656; H01M 8/04089
See application file for complete search history.

(56) References Cited

U.S. PATENT DOCUMENTS

| | | | |
|---|---|---|---|
| 11,322,762 | B2 | 5/2022 | Ikeda |
| 2008/0145715 | A1 | 6/2008 | Lienkamp et al. |
| 2016/0006057 | A1* | 1/2016 | Nakamoto ........ H01M 8/04303 429/444 |
| 2016/0380291 | A1 | 12/2016 | Poirot-Crouvezier et al. |
| 2021/0143459 | A1 | 5/2021 | Ikeda |

FOREIGN PATENT DOCUMENTS

DE    10 2020 124 141 A1    5/2021

OTHER PUBLICATIONS

French Preliminary Search Report Issued May 10, 2022 in French Application 21 07068 filed on Jun. 30, 2021 (with English Translation of Categories of Cited Documents), 10 pages.

* cited by examiner

*Primary Examiner* — Olatunji A Godo
(74) *Attorney, Agent, or Firm* — Oblon, McClelland, Maier & Neustadt, L.L.P.

(57) ABSTRACT

A fuel cell and a method for regenerating this fuel cell, including a supply of the fuel cell by the main supply conduit by a fluid having a nominal flow rate and a nominal molar fraction of combustion agent, during a regeneration phase of a given group, a switching of the inlet, outlet and recirculation switches of the fluid circuit so as to supply the given group from the recirculation line of the given group and from a fluid discharge line of at least one other group, an application of a regeneration voltage Ve to the cells of the given group, Ve being less than or equal to 0.3V.

20 Claims, 10 Drawing Sheets

SYSTEM FOR REGENERATING A FUEL CELL AND REGENERATION METHOD

CROSS-REFERENCE TO RELATED APPLICATIONS

The present application claims the benefit of the filing date of French Appl. No. 2107068, filed on Jun. 30, 2021.

TECHNICAL FIELD

The present invention relates to the field of fuel cells, in particular proton exchange membrane fuel cells (PEMFC). It can be implemented to optimise performances and to regenerate the reversible degradations of a PEMFC.

STATE OF THE ART

A fuel cell is formed of a stack of electrochemical cells, each having an anode and a cathode electrically separated from one another by an electrolyte. In the case of a hydrogen fuel cell, the fuel (hydrogen) is brought into contact with the anode, and the combustion agent (oxygen) is brought into contact with the cathode. Oxidation and reduction reactions respectively occur at the anode and at the cathode, which produces electricity and water. The electrolyte can be presented in the form of a membrane ensuring the transport of protons coming from the oxidation reaction and consumed by the reduction reaction. This is the case of proton exchange membrane fuel cells (PEMFC).

The increase in performances and the service life of PEMFCs is considered as a major challenge for the large-scale deployment of this technology.

During the operation of the PEMFC, a progressive decrease in performances is generally observed. This decrease in performance is typically due to so-called "irreversible" degradations on the one hand, and so-called "reversible" degradations on the other hand.

Irreversible degradations are linked to the physical alteration of the components of the cells, for example by corrosion of the catalyst, refinement of the membrane, loss of hydrophobicity of the gas diffusion layers. These types of degradations cannot be repaired or regenerated during the operation of the fuel cell.

Reversible degradations are linked to the interactions between the components of the cells and the reagents and/or the products, for example by intoxication of the catalysts, local drying or flooding of the cell. These types of degradations can be repaired or regenerated totally or partially during the operation of the fuel cell.

It is in particular known that the formation of superficial Pt oxides on the surface of the cathode progressively decreases the quantity of accessible active sites for the reduction reaction of the oxygen. These "Pt—Ox" oxides at the cathode can however be removed by lowering the potential of the cathode sufficiently low and for a sufficiently long time. This enables to again make the "metal Pt" active sites accessible.

The removal of the Pt—Ox can be done by reducing the air supply so as to impose a temporary air shortage, during a regeneration phase of a cell or a group of cells in the stack. Such an undersupply of air induces a very-low-potential operation for a few seconds and enables to remove a large part of the reversible degradations.

This temporary operation with air shortage however has certain disadvantages, in particular:

- a high operating heterogeneity within the cell or the group of cells, which could accelerate the irreversible degradation mechanisms;
- an exacerbation of the operating heterogeneities between the cells of the group;
- an imbalance between the cells of the group during the return to nominal conditions;
- a high drop in electrical power delivered by the fuel cell, possibly requiring an auxiliary supply;
- a decrease in yield with a high $H_2$ consumption during the low potential operation.

Document DE 102020124141 A1 discloses a solution enabling to reduce the oxygen content of the air supplying the cells, by recirculation of oxygen-depleted air within the cells of the fuel cell. This solution does not enable to resolve the operating heterogeneities of the cells.

An aim of the present invention is therefore to propose a regeneration system and method enabling to at least partially overcome these disadvantages.

In particular, an aim of the present invention is to propose a fuel cell comprising a regeneration system having improved performances.

Another aim of the present invention is to propose a method for regenerating a fuel cell.

Other aims, characteristics and advantages of the present invention will appear upon examining the following description and the accompanying drawings. It is understood that other advantages can be incorporated. In particular, certain characteristics and certain advantages of the regeneration system can be applied mutatis mutandis to the regeneration method, and conversely.

SUMMARY

To achieve this aim, according to an embodiment, a fuel cell is provided, comprising
  At least two groups of electrochemical cells each having an inlet and an outlet capable of receiving a fluid, and
  a fluid circuit intended to guide said fluid and comprising, for each group
    a fluid supply line connected to the inlet of the group in question, said fluid supply line comprising an inlet switch configured to enable or block a flow of said fluid,
    a fluid discharge line connected to the outlet of the group in question,
  each fluid supply line being connected to a main supply conduit and each fluid discharge line being connected to a main discharge conduit, said main discharge conduit comprising at least one outlet switch configured to enable or block the flow of the fluid,
  said fuel cell being characterised in that the fluid circuit further comprises, for each group
    a recirculation line configured to fluidically connect the inlet and the outlet of the group in question, said recirculation line comprising a recirculation switch configured to enable or block the flow of the fluid,
  the inlet, outlet and recirculation switches of the fluid circuit being configured to enable a supply of a given group from a recirculation line of said given group and from a fluid discharge line of at least one other group. The fluid supply and discharge, and recirculation lines, as well as the inlet, outlet and recirculation switches of the fluid circuit typically form a system for supplying and regenerating the fuel cell. This system enables an operation of the fuel cell in the production phase or in the regeneration phase.

In the scope of development of the present invention, during an operation in the regeneration phase by air shortage such as taught by the prior art, it has been discovered that the high operating heterogeneity within the group of cells in particular comes from a low fluid flow rate within the group, which degrades the air distribution at the cells of the group. This leads to a localised reaction at the air inlet, with a very localised water and heat production which accelerates the irreversible degradation mechanisms. The low distribution of reagents, in particular of the combustion agent, negatively impacts the operation of the fuel cell, also during the return to the nominal production phase.

On the contrary, in the present invention, during a regeneration phase, the system advantageously enables to deplete the supply fluid of reagents or of combustion agent, while maintaining a high fluid flow rate. Thus, by suitably switching the inlet, outlet and recirculation switches of the fluid circuit, a given group is advantageously supplied by a fluid partially coming from the outlet of at least one other group and partially from said given group, by recirculation between the inlet and the outlet of this given group. This fluid is typically intended to provide the reagent species with the electrodes of the cells, and to discharge the reaction products. In particular, the fluid brings the combustion agent to the cathode of each cell. When the fluid passes through a group of cells, the molar fraction of combustion agent in the fluid decreases. The supply of a group by a fluid having passed through at least one other group is therefore depleted of combustion agent. The recirculation of the fluid between the inlet and the outlet of a given group also depletes the fluid of combustion agent. A group partially supplied by the outlet of another group and partially by recirculation is therefore supplied by a depleted fluid, even highly depleted, of combustion agent. This enables this group to operate at a very low potential, for example at a regeneration voltage $Ve \leq 0.3V$, and consequently, to regenerate. Advantageously, only the molar fraction of the combustion agent is modified during the regeneration phase, and the flow rate remains sufficiently high to avoid a low distribution of the depleted fluid within the group. The maintaining of a sufficiently high flow rate can be done by a recirculation pump on the recirculation line.

The system advantageously enables to supply both a given group by a fluid depleted of combustion agent, and the other group(s) by a fluid having a molar fraction of nominal combustion agent. This enables to regenerate the given group while ensuring a nominal electricity production via the other groups. It is not necessary to resort to an auxiliary supply during the regeneration phase.

Advantageously, by suitably switching the inlet, outlet and recirculation switches of the fluid circuit, different fluid paths can be formed between the groups of cells. The fluid thus flows in the fluid circuit along these fluid paths. The fluid paths can be established in a versatile manner, as needed. As indicated above, during a regeneration phase of a given group, the fluid path is preferably chosen such that the fluid supplying said given group is depleted of combustion agent, by recirculation from said given group and by passage through at least one other group.

The fluid path is preferably chosen such that said depleted fluid supplying the given group has, during the regeneration phase, a circulation direction through the inverted group with respect to the circulation direction normally adopted during a nominal production phase of the group. This inversion of the flow direction of the fluid in a given group can typically be done via the recirculation pump of the recirculation line. The inversion of the circulation direction of the fluid through the group in the regeneration phase enables to better distribute the fluid within the cells of the group. The regeneration of the cells of the group is thus more homogenous.

The suitable switching of the inlet, outlet and recirculation switches of the fluid circuit can be done by a control/command system of the PEMFC. Such a system can be advantageously integrated with the PEMFC.

The system according to the present invention enables a low-potential, homogenous and stabilised operation of the group during regeneration. Such an operation is typically based on a supply to the cathode of dioxygen-depleted air while maximising the air volume flow in the group during regeneration. This enables, in particular:

a (re)hydration of the active layers and of the membrane in the cells of this group, a reduction of the superficial Pt oxides and a desorption of the species possibly adsorbed at the catalyst(s) of the cathodes, a high gas flow rate at the cathodes, ensuring a good fluid distribution within the cells and between the cells, and a good discharging of the liquid water, a limiting of the $H_2$ consumption and of the heat production during this low-potential regeneration phase.

Thus, the solution proposed comprises a regeneration system having considerably improved performances with respect to the known solutions.

According to another aspect, a method for regenerating a fuel cell such as described above is provided. This method comprises:

A supply of the fuel cell by the main supply conduit by a fluid having a nominal flow rate and a nominal molar fraction of combustion agent, during a regeneration phase of a given group:

A switching of the inlet, outlet and recirculation switches of the fluid circuit so as to supply the given group from the recirculation line of said given group and from a fluid discharge line of at least one other group, An application of a regeneration voltage Ve to the cells of said given group, Ve being less than or equal to 0.3V.

The method thus enables to regenerate the given group by depleting the molar fraction of combustion agent of the supply fluid and by maintaining a regeneration voltage $Ve \leq 0.3V$. During the development of the present invention, it has been observed that the application of a regeneration voltage $Ve \leq 0.3V$ in a combustion agent-depleted atmosphere enables to effectively reduce the superficial Pt—Ox oxides at the cathodes of the cells. The regeneration is thus more effective and quicker.

The supply flow rate of the given group during the regeneration phase is preferably substantially equal to the nominal flow rate. This enables to avoid a local heating of the cells of the group in the regeneration phase.

BRIEF DESCRIPTION OF THE FIGURES

The aim, objectives, as well as the characteristics and advantages of the invention will emerge best from the detailed description of embodiments of the latter which are illustrated by the following accompanying drawings, wherein.

Figure 1:
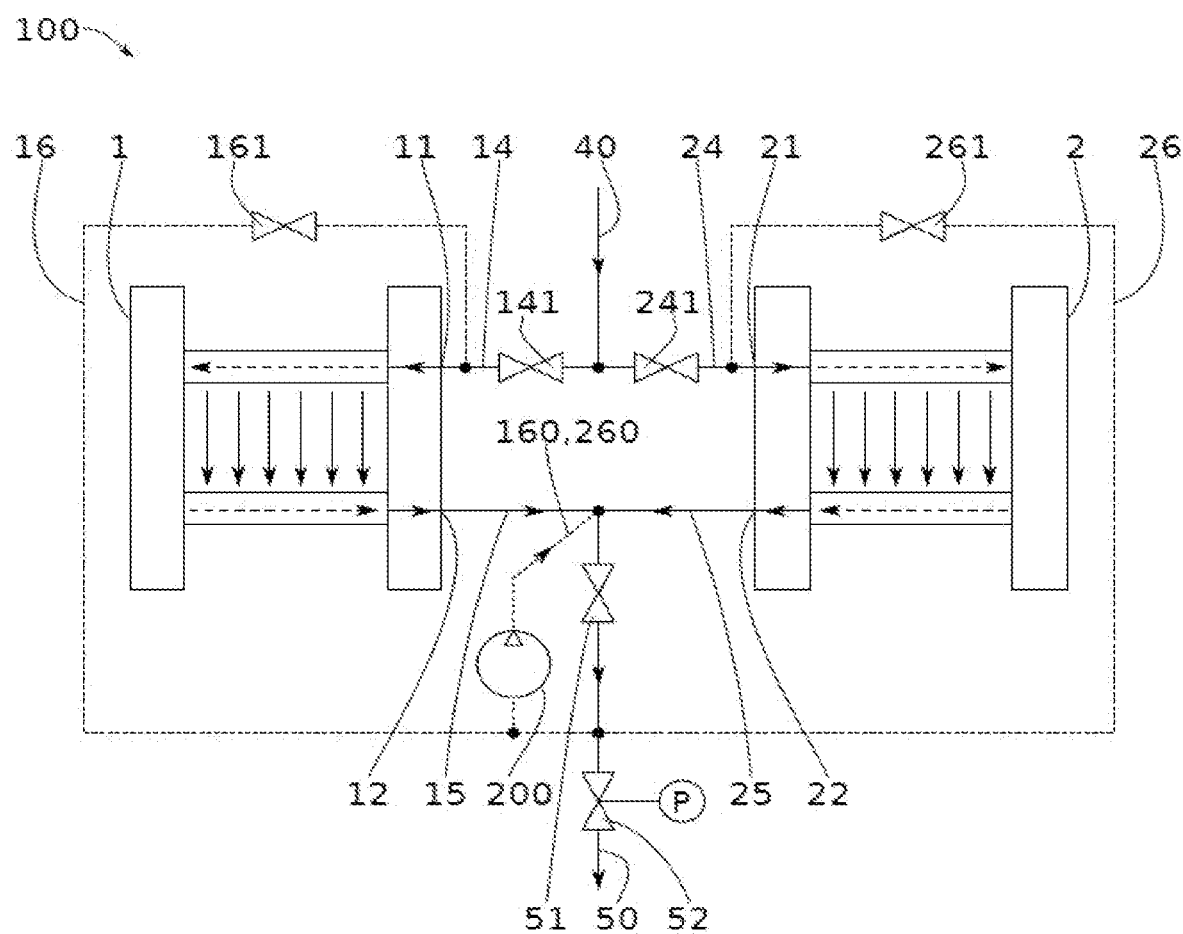
FIG. 1 schematically illustrates a fuel cell comprising two groups in the nominal production phase, according to an embodiment of the present invention.

The drawings are given as examples are not limiting of the invention. They constitute principle schematic representations intended to facilitate the understanding of the invention and are not necessarily to the scale of practical applications.

DETAILED DESCRIPTION

Before starting a detailed review of embodiments of the invention, below are stated optional characteristics which can possibly be used in association or alternatively:

According to an example, during a regeneration phase of a first group:
- at least one second group is supplied with fluid by the main supply conduit,
- the first group is supplied with fluid by the outlet of the second group, and by its own outlet, by recirculation of said fluid via its recirculation line.

According to an example, the fluid has a first flow direction in the given group during the regeneration phase of said given group, and a second flow direction in the given group during a nominal production phase of said given group, the first flow direction being opposite the second flow direction and the nominal production phase being separate from the regeneration phase.

According to an example, the recirculation line of a group has at least one common section with the recirculation line of at least one other group.

According to an example, the fluid circuit further comprises a recirculation pump common to each recirculation line of the fluid circuit, said recirculation pump being configured to maintain a sufficient fluid flow rate in the given group during the regeneration phase, in particular a fluid flow rate greater than or equal to 50% of a nominal flow rate measured in the main supply conduit. This fluid flow rate can be greater than or equal to 80% of the nominal flow rate. The use of a recirculation pump to complementarily supply the group in the regeneration phase enables in particular a better fluid homogenisation between and within the cells of the group.

The recirculation of the fluid in the group via the recirculation line also enables to decrease the molar fraction of combustion agent (oxygen) at the inlet of the group and, subsequently, to obtain a better distribution of the current density along the cells of the group. This thus enables to more easily lower the potential of the cells at a given current. This ultimately enables to consume less hydrogen and to limit the heat generation. This also enables to limit the water production in the cells. This further enables to avoid a local accumulation of liquid water in the cell. This thus enables to optimise the regeneration of performances of the cell/of the group in question.

The recirculation of the fluid via the recirculation line advantageously enables to reinject the sufficiently humid fluid into the inlet of the group. The humidity gradients in the cells of the group are thus limited. This enables to avoid a drying of the cells during the regeneration.

The recirculation pump is preferably sized to supply one single group or a few groups of cells only. It is thus possible to use a power pump and/or of reduced size.

According to an example, the recirculation pump is configured to enable an inversion of a flow direction of the fluid in said given group. This enables to homogenise the distribution of combustion agent and/or of current density between and within the cells of the group.

According to an example, the fuel cell further comprises a control/command system configured to command the inlet, outlet and recirculation switches of the fluid circuit so as to enable or block the flow of the fluid along a chosen fluid path. Regeneration cycles can thus be easily programmed, on each of the groups of the fuel cell alternatively and/or successively. The phases of nominally producing, regenerating a group, stopping the fuel cell are advantageously controlled by such a control/command system. The control/command system can typically consider the electrical and/or fluid production parameters of one or more groups, consumption of power produced, load losses within the fuel cell, to determine the fluid path(s) ad hoc according to the operating phase of the fuel cell. The electrical performances of the fuel cell can typically be used to evaluate the need to regenerate one or more groups of the fuel cell.

According to an example, the fuel cell comprises at least three groups of electrochemical cells. One single group is in the regeneration phase when the two others are in the nominal production phase. Thus, the fuel cell can continue to produce the electrical energy thanks to the operation of the groups in the nominal production phase.

According to an example, during the regeneration phase of a given group, the supply of the given group is done from the recirculation line of said given group and from the fluid discharge lines of at least two other groups of the fuel cell. These other groups contribute to the supply of depleted fluid of the group in question by the regeneration phase.

According to an example, the regeneration phase is configured such that the molar fraction of combustion agent of the fluid circulating through the given group is less than or equal to 50% of the nominal molar fraction of combustion agent. Such a depletion of combustion agent enables to lower the operating voltage of the group in regeneration. A low voltage enables to effectively reduce the superficial Pt oxides. The active sites of the catalyst are thus reactivated. The reversible degradations are in large part, removed.

According to an example, the fluid circulating through the given group has a flow rate greater than or equal to 50% of the nominal flow rate. This enables to maintain a sufficiently quick circulation of the fluid in the cells, such that all the combustion agent is not consumed at the outlet of the group in the regeneration phase. A difference in molar fraction of combustion agent between the inlet and the outlet of the group of less than 6%, for example of around 3%, can thus be advantageously obtained. Thus, the fluid loses typically 3 percentage points by passing through the group in the regeneration phase. Its molar fraction of combustion agent can thus go from 10% to 7% by passing through the group. According to another example, the molar fraction of combustion agent of the fluid passing through the group can thus go from 7% to 4%. A significant fluid flow rate also enables a good stirring of the fluid between and within the cells of the group. A more effective and more homogenous regeneration is thus obtained.

According to an example, the regeneration phase is carried out for a duration t less than or equal to 10 s.

According to an example, the regeneration phase is carried out alternatively on each group of electrochemical cells of the fuel cell.

According to an example, the regeneration phase comprises an inversion of the flow direction of the fluid in said given group. This enables to improve the stirring between and within the cells of the group, and to homogenise the regeneration of the group.

According to an example, the regeneration phase is carried out when the fuel cell does not need to operate in the nominal production phase, in particular when an electrical production requested at the fuel cell is less than a nominal electrical production of the fuel cell.

According to an example, the fuel cell comprises at least three groups and the regeneration phase is carried out simultaneously on the given group and on at least one other group.

According to an example, at least one group of the fuel cell is in the nominal production phase during the regeneration phase of at least one given group.

Except if incompatible, it is understood that the regeneration method and the regeneration system of the fuel cell can comprise, mutatis mutandis, all of the optional characteristics above.

Thus, technical characteristics described in detail for a given embodiment can be combined with the technical characteristics described in the context of other embodiments described as an example and in a non-limiting manner. In particular, elements described or illustrated in the figures for the fuel cell or for the method can be combined so as to form another embodiment which is not necessarily illustrated or described. Such an embodiment is, of course, not excluded from the invention. A fuel cell according to the present invention typically comprises more than two groups, and typically more than three groups of electrochemical cells. The limited number of groups illustrated in the accompanying drawings aims to facilitate the understanding of the regeneration principle according to the invention. A person skilled in the art will have no difficulty in implementing an embodiment comprising more than three groups of electrochemical cells.

In the scope of the present invention, by "fuel cell", this means a system comprising several groups of electrochemical cells. Each group is thus constituted of a series of interconnected electrochemical cells. The cells are presented typically in the form of a membrane-electrode assembly, commonly called MEA. The groups can form one single stack of cells. Alternatively, the groups can form stacks, separate from one another, as illustrated in the accompanying figures. When the groups form one single stack, each group preferably has a reagent supply conduit which itself is clean. The discharge conduit can be common to all of the groups. Moreover, the clamping plates maintaining the cells in such one single stack can typically electrically interconnect all the cells together. The cells are thus typically mounted in series. The same electrical current will thus be applied to all the groups of the stack, whatever the operating phase.

The fuel cell typically has different operating phases, in particular, a nominal production phase, a regeneration phase, a stop phase.

During a nominal production phase, the groups of the fuel cell are supplied in parallel by a supply fluid.

During a regeneration phase of a given group, this given group is supplied in series from at least one other group.

During a stop phase, the fuel cell is no longer supplier by the main supply conduit. The groups can continue to be supplied temporarily and degressively by recirculation.

The groups of the fuel cell can be electrically interconnected in series. Alternatively, one or more groups can be connected independently of one another to a network through electrical converters enabling an individual controlling. The groups are not connected in parallel, as the voltage of the group in regeneration must be less than those of the groups in nominal production.

In the scope of the present invention, an inlet or an outlet of a group typically each have a structural aspect and an operational aspect. Thus structurally, the inlet and the outlet correspond to the first and second passage orifices for the supply fluid. Operationally, the inlet and the outlet respectively mean the entry and the discharge of the supply fluid. Insofar as the circulation direction of the fluid can be inverted, the inlet and the outlet can be physically switched. Thus, the first passage orifice can form the inlet or the outlet, and conversely, the second passage orifice can form the outlet or the inlet.

To facilitate the understanding regarding the fluid circulation in the cells of the fuel cell, only the terms inlet/outlet and their corresponding references on the accompanying drawings are preserved, respectively X1 (X=1 . . . 3) for the inlet and X2 (X=1 . . . 3) for the outlet, independently of the orifice materially in question.

In the scope of the present invention, the recirculation line is configured to fluidically connect the inlet and the outlet of the group in question. This recirculation line extends between the inlet and the outlet of the group in question. Each recirculation line is specific to the group in question. It does not pass through a group other than the group in question. It can borrow sections from other lines, for example from the supply and/or discharge lines. Thus, sections of the recirculation line can be common with sections of other lines. Tapping points or junctions can be physically present along this recirculation line. Members can also be present along this recirculation line. These are regulation members such as the recirculation switch and the recirculation pump. These members do not include any other group of electrochemical cells. The recirculation line fluidically connects the inlet and the outlet of the only group to which it is attached. Thus, the inlet of a group is fluidically connected to the outlet of the same group, via the recirculation line.

Other elements, for example, of liquid water collection volumes associated with phase separation devices, or possible thermal heaters/exchangers avoiding the formation of condensation points in the lines, or also anti-return devices, can also be present along the lines. For clarity, these elements are not necessarily illustrated in the accompanying figures.

Several embodiments of the invention implementing successive steps of the regeneration method are described below. Unless explicitly mentioned otherwise, the adjective "successive" does not necessarily imply, even if this is generally preferred, that the steps immediately follow one another, intermediate steps could separate them.

Moreover, the term "step" means the fulfilment of some of the method, and can mean a set of substeps.

Moreover, the term "step" does not compulsorily mean that the actions conducted during a step are simultaneous or immediately successive. Certain actions of a first step can in particular be followed by actions linked to a different step, and other actions of the first step can be then resumed. Thus, the term "step" does not necessarily mean single and inseparable actions over time and in the sequence of phases of the method.

In the present application, by "stoichiometry", this means the ratio between the quantity of reagent at the inlet and the quantity consumed by the electrochemical reaction. If the molar fraction at the cell out can be evaluated by a simple mass balance, the evolution along the cells inside the group or the fuel cell is not generally known. Thus, a stoichiometry of 2 indicates that the quantity of reagent at the inlet (typically the combustion agent $O_2$) is two times greater than the quantity of reagent at the outlet. A stoichiometry of 1.5 indicates that the quantity of reagent at the inlet (typically the combustion agent $O_2$) is three times greater than the quantity of reagent at the outlet. A stoichiometry of 1 indicates that the reagent introduced in the cell is totally consumed by the electrochemical reaction.

In the accompanying figures, a circulation direction of the fluid in the fluid circuit is indicated by an arrow. The passing or blocking switches (typically open or closed valves) are illustrated. The dotted line illustrates different molar fractions of combustion agent of the fluid circulating in the fluid line in question, i.e. the supply line or the discharge line or the recirculation line.

In the following examples, the supply fluid of the fuel cell is air having a nominal molar fraction of oxygen of around 21%, and a nominal flow rate. The molar fractions of oxygen mean molar % of dry gas. To simplify, each group is considered identical and comprises an identical number of cells. The operating stoichiometry, current and voltage values are therefore identical between each group. It is however perfectly considerable to implement one or more differently-sized groups, without moving away from the general regeneration principle explained below.

A first example of a fuel cell 100 comprising a regeneration system according to the invention is illustrated in FIGS. 1 to 4. In this example, the fuel cell comprises two groups 1, 2 connected via a fluid circuit. The fuel cell is sized, such that the overall stoichiometry is greater than 1. For such a fuel cell comprising two identical groups, the unitary stoichiometry value, for each of the groups, can therefore be typically greater than or equal to 2.0. In this case, the molar fraction of oxygen at the outlet of each of the groups, which depends on this unitary stoichiometry, is around 11.7%. To obtain a good performance of the fuel cell, an overall stoichiometry value of between 1.6 and 2.0 is preferably chosen. The fuel cell and the fluid circuit are subsequently consequently sized, typically by considering the load losses within the groups.

The fluid circuit typically comprises a main supply conduit 40, supply lines 14, 24, discharge lines 15, 25, recirculation lines 16, 26 and a main discharge conduit 50. This fluid circuit further comprises inlet switches 141, 241, outlet switches 51, 52, recirculation switches 161, 261. The discharge lines 15, 25 preferably have no switch. The structure of this fuel cell does not vary in FIGS. 1 to 4. Only the blocking or passing state of the different switches, determining the circulation path of the fluid in the fluid circuit, varies. The assignation of the inlets and outlet also varies, according to the different operating phases of the fuel cell and of the circulation direction of the supply fluid.

Figure 2:
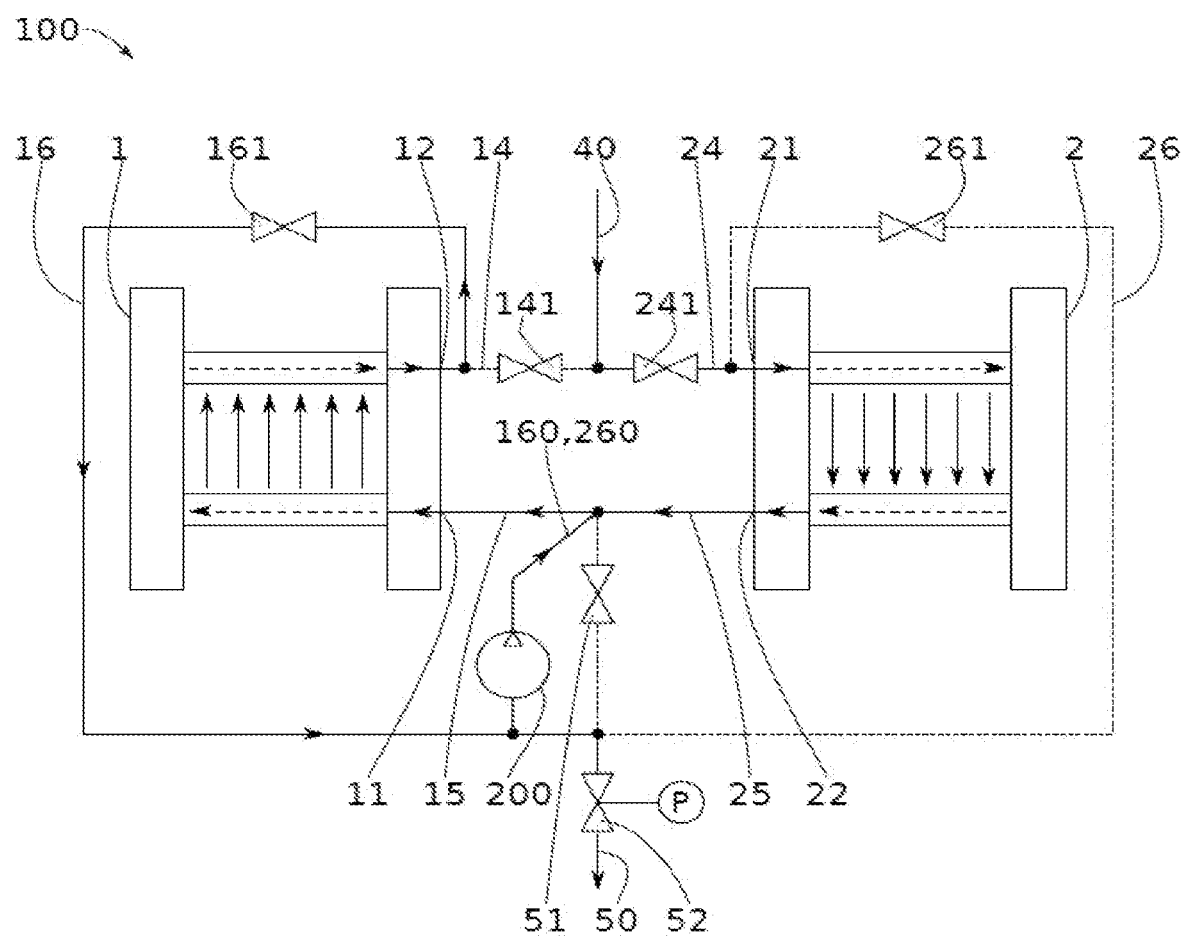
FIG. 2 schematically illustrates a fuel cell comprising two groups, one of the groups being in the regeneration phase, according to an embodiment of the present invention.
Figure 3:
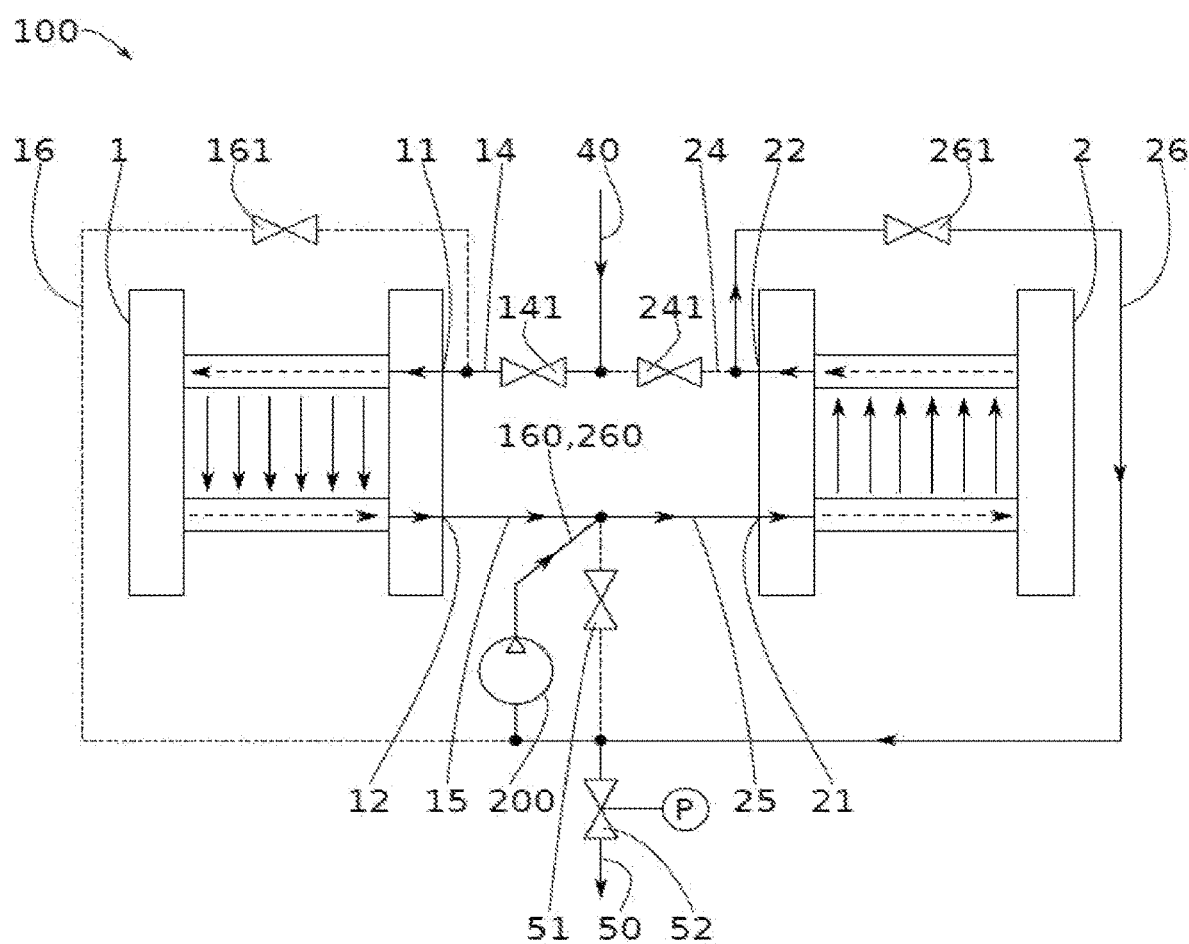
FIG. 3 schematically illustrates a fuel cell comprising two groups, the other of the groups being in the regeneration phase, according to an embodiment of the present invention.
Figure 4:
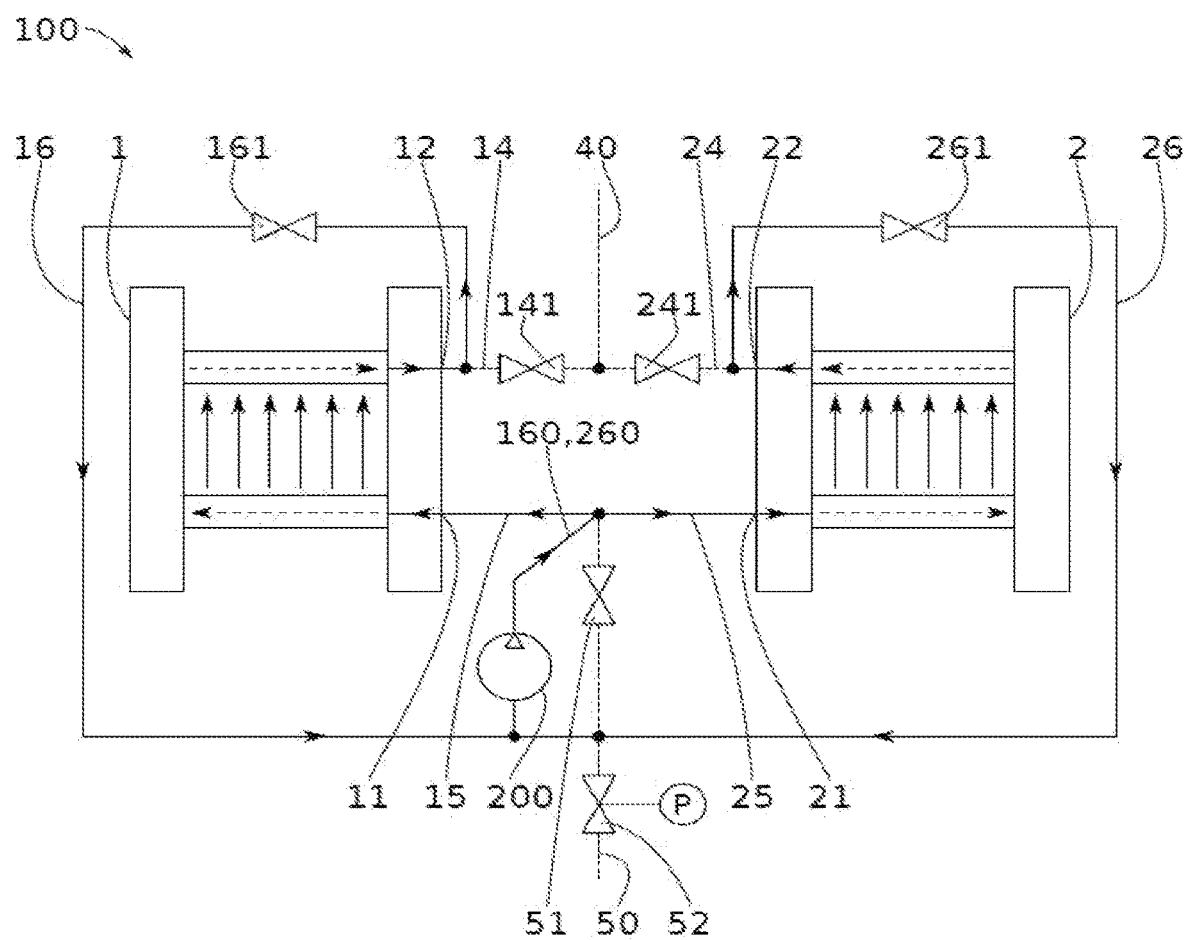
FIG. 4 schematically illustrates a fuel cell comprising two groups in the stop phase, according to an embodiment of the present invention.

FIG. 1 illustrates an operation of this fuel cell during a nominal production phase. FIG. 2 illustrates an operation of this fuel cell during a regeneration phase of the group 1. FIG. 3 illustrates an operation of this fuel cell during a regeneration phase of the group 2. FIG. 4 illustrates an operation of this fuel cell during a stop phase.

As illustrated in FIG. 1, during a nominal production phase, all the groups 1, 2 are supplied in parallel, simultaneously. Thus, the air entering into the fuel cell and having a nominal molar fraction of oxygen (typically 21%) is brought by the main supply conduit 40 and distributed to the inlet 11 of the group 1 and at the inlet 21 of the group 2. The inlet switches 141, 241 are passing or open. The air circulates in each supply line 14, 24 to the respective inlets 11, 21 of the groups 1 and 2. After having passed through the groups 1 and 2, the air exits through the respective outlets 12, 22 and circulates in each discharge line 15, 25 to the main discharge conduit 50. The outlet switches 51, 52 are open. The switch 52 is preferably a pressure regulator. This enables to control the air pressure within the fuel cell. The recirculation switches 161, 261 are closed, such that the air does not circulate in the recirculation lines 16, 26. This operating phase corresponds to the nominal operation of the fuel cell in the absence of regeneration of performances.

As illustrated in FIGS. 2 and 3 during a regeneration phase, a group is supplied in series from at least one other group. Thus, in the example of FIG. 2, the group 1 is in the process of regeneration and the group 2 is in the process of nominal production. In this example, the air entering into the fuel cell and having a nominal molar fraction of oxygen (typically 21%) is brought through the main supply conduit 40 to the inlet 21 of the group 2 only. The inlet switch 141 of the group 1 is closed. The inlet switch 241 of the group 2 is open. The air circulates in the supply line 24 to the inlet 21. After having passed through the group 2, the air exits through the outlet 22 and circulates in the discharge line 25 to the inlet 11 of the group 1. The outlet switch 51 is closed. The group 1 is thus supplied by oxygen-depleted air coming from the outlet 22 of the group 2. This air has, for example, a molar fraction of $O_2$ of around 11.7% at the outlet 22 of the group 2.

To decrease even further the molar fraction of oxygen of the air supplying the group 1 in the regeneration phase, the air exiting from the group 1 through the outlet 12 is advantageously partially reinjected into the group 1 through the inlet 11 via the recirculation line 16, preferably thanks to a recirculation pump 200. The recirculation switch 161 is open, in this case, while the recirculation switch 261 is closed. Some of the air circulating in the recirculation line 16 is discharged via the main discharge conduit 50 and the pressure regulator 52. In the example illustrated, the recirculation line 16 typically has a junction P1 with the discharge lines 15, 25, and a junction P2 with the main discharge conduit 50. The recirculation line 16 comprises, in this case, the section 160 between the recirculation pump 200 and the junction P1.

The recirculation enables to decrease the molar fraction of oxygen of the air (excluding water vapour) supplying the group 1 typically by below 7%, even 5%. Such a reduced molar fraction of oxygen enables to decrease the operating voltage of the fuel cell, in a current regulation condition of the fuel cell. This advantageously enables to favour the quick reduction of superficial Pt—Ox oxides. This operating voltage is preferably less than 0.3V, and more preferably less than or equal to 0.2V.

The recirculation also enables to improve the homogeneity of the molar fraction of oxygen between the inlet 11 and the outlet 12 of the group 1. The recirculation line 16 and the recirculation switch 161 are sized so as to reach a difference in molar fraction of less than 6%, and preferably of around 3%, between the inlet 11 and the outlet 12 of the group 1. Thus, the difference of molar fraction $x_{O2} = x_{O2,inlet} - x_{O2,outlet}$ between the molar fraction at the inlet $x_{O2,inlet}$ and the molar fraction $x_{O2,outlet}$ is less than or equal, in any case, to 6%.

The molar fraction of oxygen entering into the group 1 can thus be controlled by fixing the current I in the subgroup 1, the air flow rate and the recirculation rate (i.e. the ratio between the reinjected air part and the discharged air part).

The recirculation also enables to reinject the sufficiently humid fluid into the inlet of the group. The humidity gradients in the cells of the group are thus limited. This enables to avoid a drying of the cells during the regeneration.

Advantageously, a recirculation pump 200 is disposed on the recirculation line 16. This enables to more effectively reinject the depleted air into the group 1 in the process of regeneration. This also enables to preserve a sufficiently high air flow rate, for example greater than around 50% of the nominal flow rate, even greater than 80% of the nominal flow rate at the inlet 11 of the group 1.

The use of a recirculation pump 200 thus enables a better fluid homogenisation between and within the cells of the group 1. This further enables to avoid a local accumulation of liquid water in the cells.

The recirculation pump 200 is preferably sized to supply the only group(s) in question by the regeneration phase. It is thus possible to use a power pump and/or of reduced size. The recirculation pump 200 further preferably enables an inversion of the circulation direction of the air in the group 1.

Advantageously, the circulation direction of the air in the group 1 is inverted during the regeneration phase, with respect to the usual circulation direction during the nominal production phase, as illustrated in FIGS. 1 and 2. This enables a gaseous stirring inside the cells of the group 1 and a better homogenisation of the molar fraction of water and of oxygen inside the cells.

The duration of the regeneration phase is typically of around one second to a few seconds. After regeneration of the group 1, the group 2 can be regenerated itself.

In the example illustrated in FIG. 3, the group 2 is in the process of regeneration and the group 1 is in the process of nominal production. In this example, the air is brought through the main supply conduit 40 to the inlet 11 of the group 1 only. The inlet switch 241 of the group 2 is closed. The inlet switch 141 of the group 1 is open. The air circulates in the supply line 14 to the inlet 11. After having passed through the group 1, the air exits through the outlet 12 and circulates in the discharge line 15 to the inlet 21 of the group 2. The outlet switch 51 is closed. The group 2 is thus supplied by oxygen-depleted air coming from the outlet 12 of the group 1.

To decrease even further the molar fraction of oxygen of the air supplying the group 2 in the regeneration phase, the air exiting from the group 2 through the outlet 22 is advantageously partially reinjected into the group 2 through the inlet 21 via the recirculation line 26, preferably thanks to the recirculation pump 200. The recirculation switch 261 is open, in this case, while the recirculation switch 161 is closed. Some of the air circulating in the recirculation line 26 is discharged via the main discharge conduit 50 and the pressure regulator 52. The recirculation pump 200 is common to the recirculation lines 16, 26. In the example illustrated, the recirculation line 26 typically has a junction P1 with the discharge lines 15, 25, and a junction P2 with the main discharge conduit 50. The recirculation line 26 in this case comprises the section 260 between the recirculation pump 200 and the junction P1.

The effects and advantages described above in the case of the regeneration of the group 1 are perfectly transposable in the case of the regeneration of the group 2 and are not therefore repeated here, for brevity.

The three operating phases described above and illustrated in FIGS. 1, 2 and 3 can be carried out alternatively to optimise the overall performances of the fuel cell and of the groups. The occurrence, the alternance and the duration of these different production and regeneration phases can be defined according to:
- the power supply need of the fuel cell,
- a given performance criterion (for example, a voltage threshold at a given operating point, or as regards an unsuitable or instable operating window),
- an imbalance of load losses between the groups or an imbalance of performances between the groups.

The architecture of the fluid circuit of the fuel cell also enables, advantageously, to improve a stop phase of the fuel cell.

As illustrated in FIG. 4, during a stop phase of the fuel cell, it is possible to cut off the air supply at the main supply conduit 40, while enabling a recirculation of air in each of the groups 1, 2. The inlet switches 141, 241 are closed. The recirculation pump 200 enables the air to circulate in each recirculation line 16, 26. The recirculation switches 161, 261 are open. The outlet switches 51, 52 are closed. This stop phase thus operates in a quasi-closed circuit.

This operation without new air intake on all of the groups enables to very highly deplete the air in oxygen and to quickly lower the voltage at the terminals of the cathodes of the groups of cells, while discharging the liquid water. This stop phase by recirculation can be accompanied by a minimum voltage level and/or a minimum duration. The hydrogen supply to the anode of the cells can be maintained during this phase to avoid a local shortage of combustion agent and an accumulation of liquid water in the cells. Alternatively, the hydrogen supply can be pulsed, even cut off.

After this stop phase, the groups are typically loaded with hydrogen and nitrogen ($H_2+N_2$), respectively at the anodes and the cathodes. This enables a progressive restart of the fuel cell. This enables to avoid a degradation of the groups of the fuel cell during the restart. The degradation phenomenon during the restart is indeed potentially linked to the formation of an $H_2$/air front to the anode and the presence of air to the cathode.

A second example of a fuel cell 100 comprising a regeneration system according to the invention is illustrated in FIGS. 5 to 9. In this example, the fuel cell comprises three groups 1, 2, 3 connected via the fluid circuit. As above, the fuel cell and the fluid circuit are sized so as to obtain an overall stoichiometry of between 1.6 and 2.0, typically by considering load losses within the groups 1, 2, 3.

The fluid circuit typically comprises a main supply conduit 40, supply lines 14, 24, 34, discharge lines 15, 25, 35, recirculation lines 16, 26, 36 and a main discharge conduit 50. This fluid circuit further comprises inlet switches 141, 241, 341, outlet switches 51, 52, recirculation switches 161, 261, 361. The structure of this fuel cell does not vary in FIGS. 5 to 9. Only the blocking or passing state of the different switches, determining the circulation path of the fluid in the fluid circuit, varies. The assignation of the inlets and outlet also varies, according to the different operating phases of the fuel cell and of the circulation direction of the supply fluid.

Figure 5:
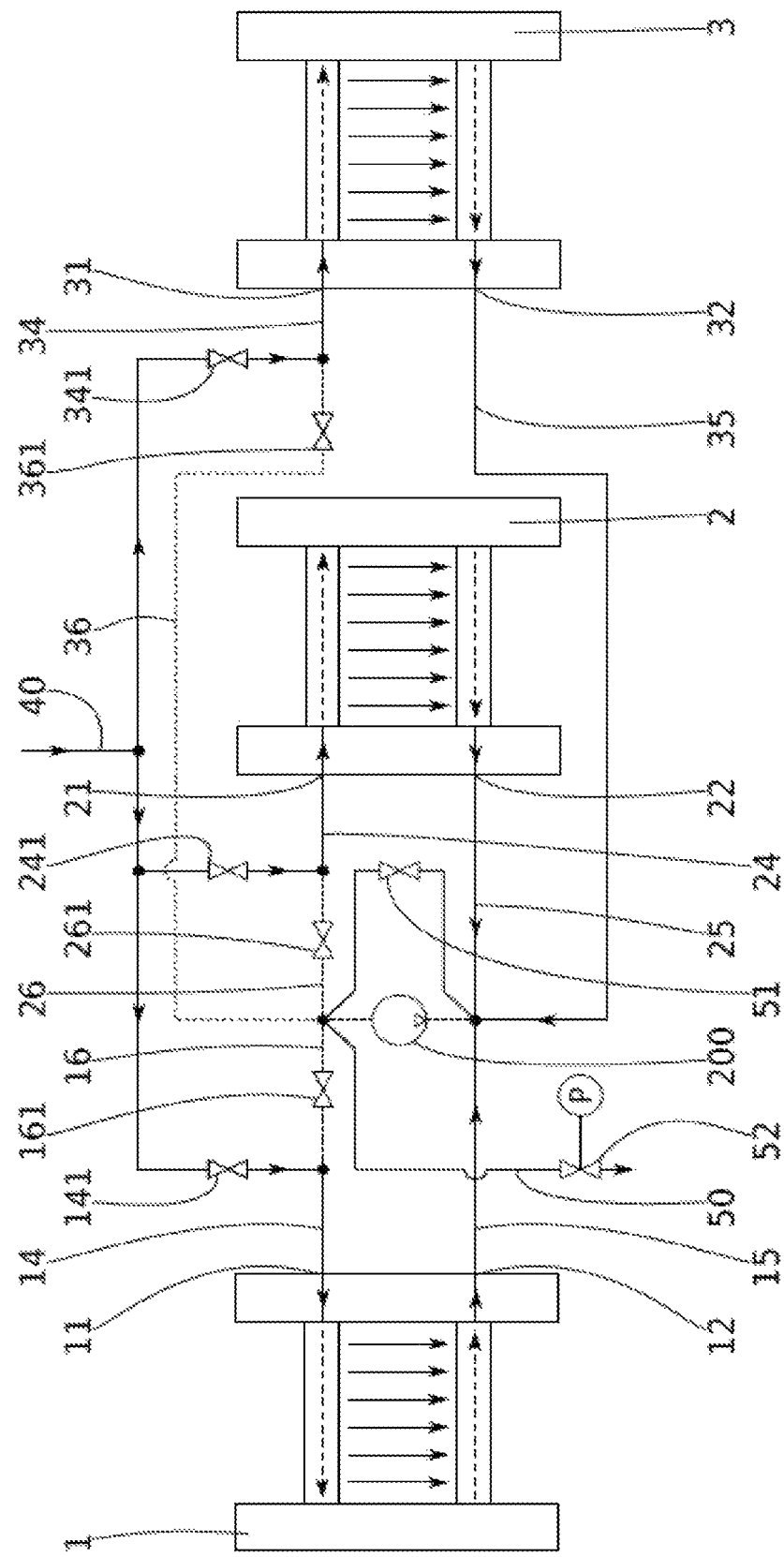
FIG. 5 schematically illustrates a fuel cell comprising three groups in the nominal production phase, according to an embodiment of the present invention.
Figure 6A:
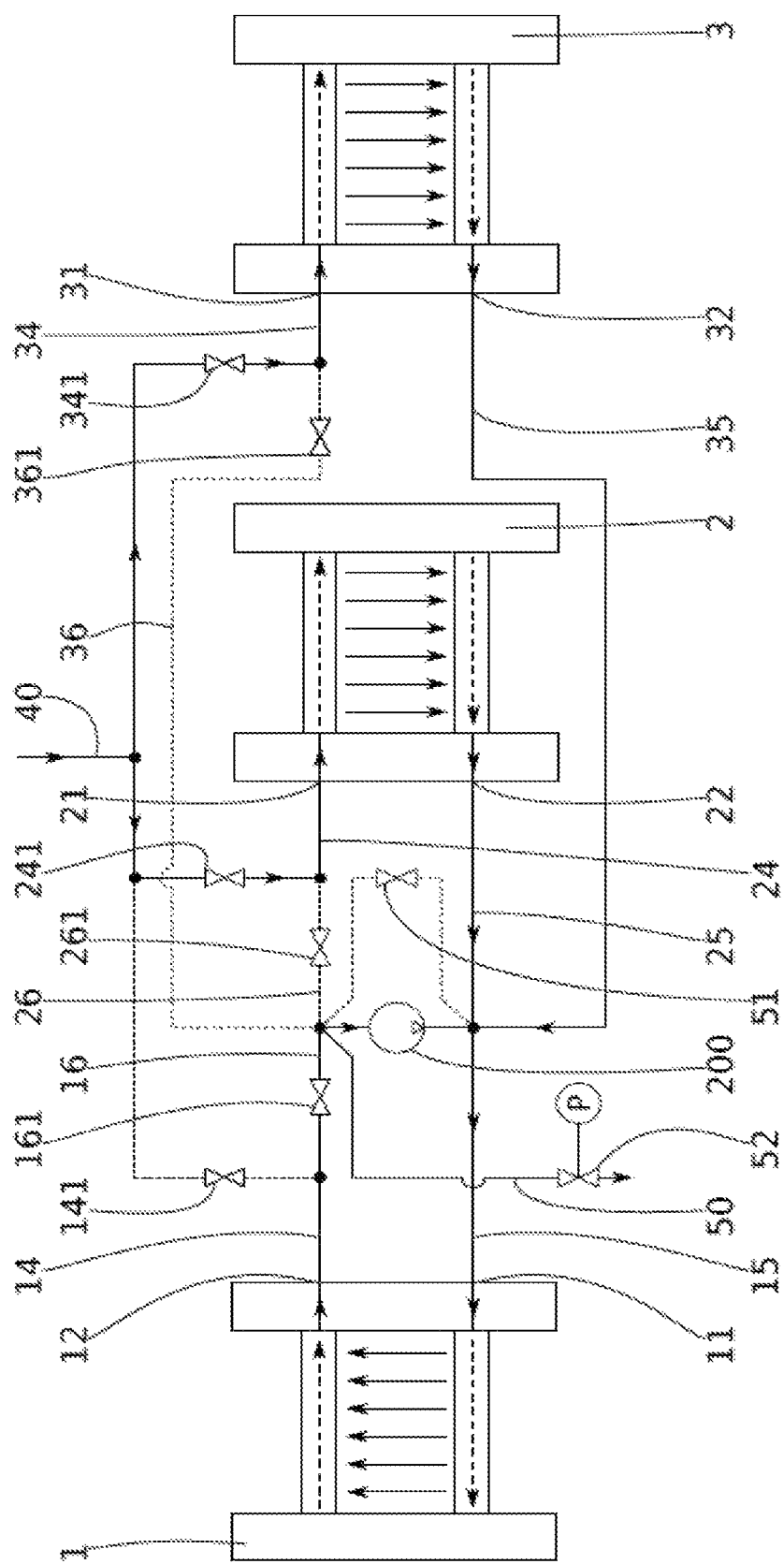
FIG. 6A schematically illustrates a fuel cell comprising three groups, a first group from among the three groups being in the regeneration phase, according to an embodiment of the present invention.
Figure 6B:
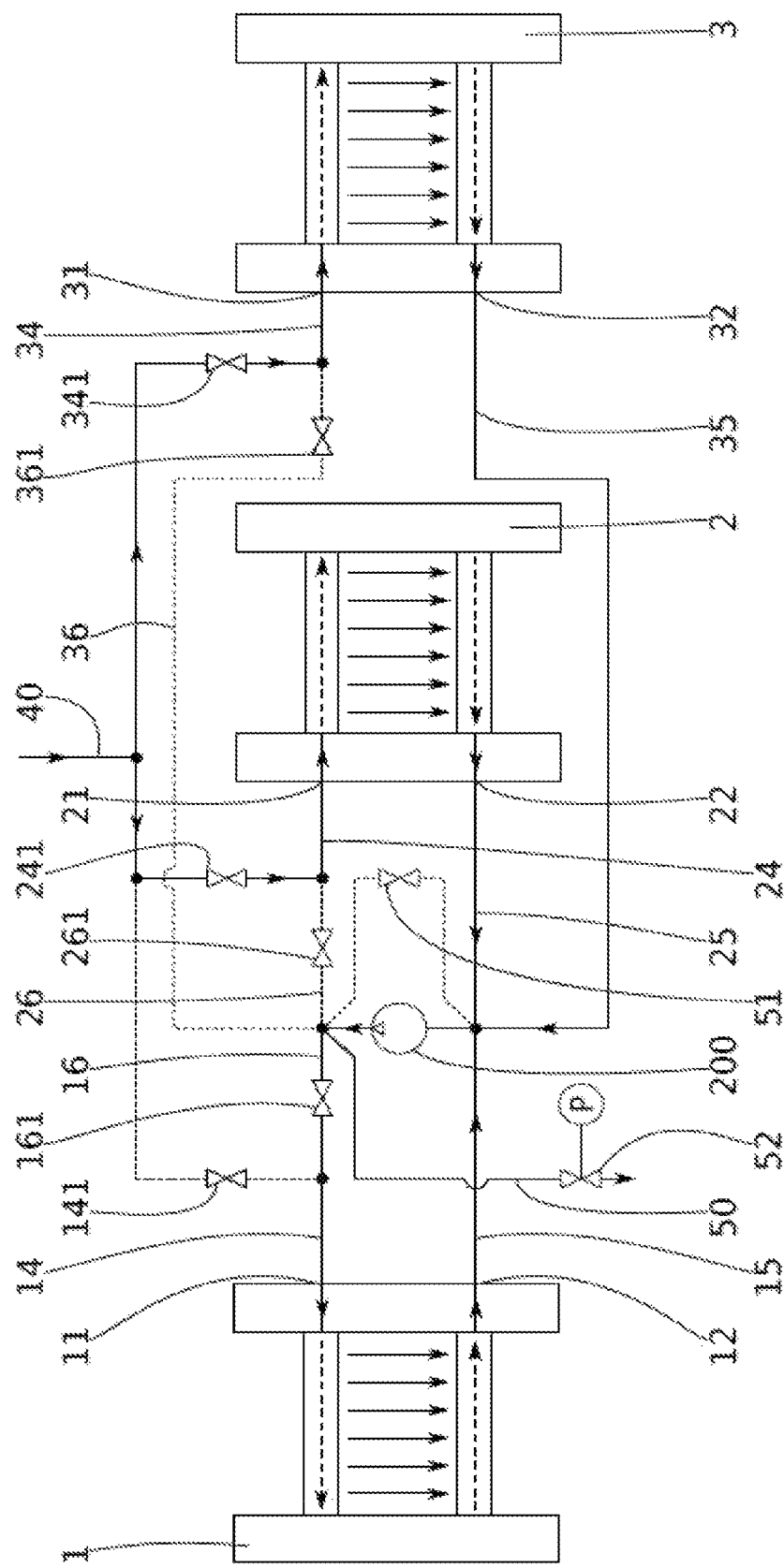
FIG. 6B schematically illustrates a fuel cell comprising three groups, a first group from among the three groups being in the regeneration phase with an inverted fluid circulation with respect to the fluid circulation illustrated in FIG. 6A, according to an embodiment of the present invention.
Figure 7:
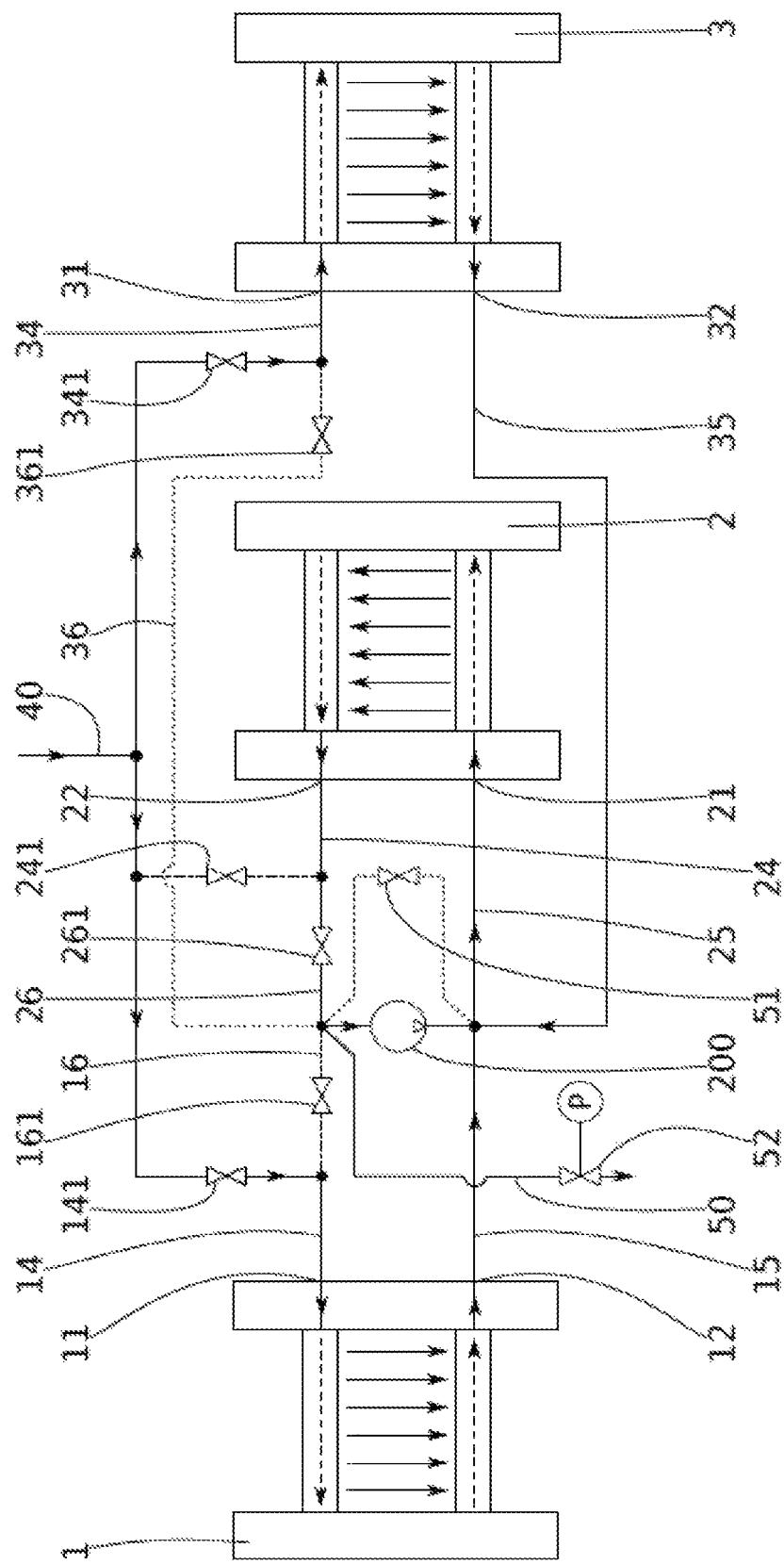
FIG. 7 schematically illustrates a fuel cell comprising three groups, a second group from among the three groups being in the regeneration phase, according to an embodiment of the present invention.
Figure 8:
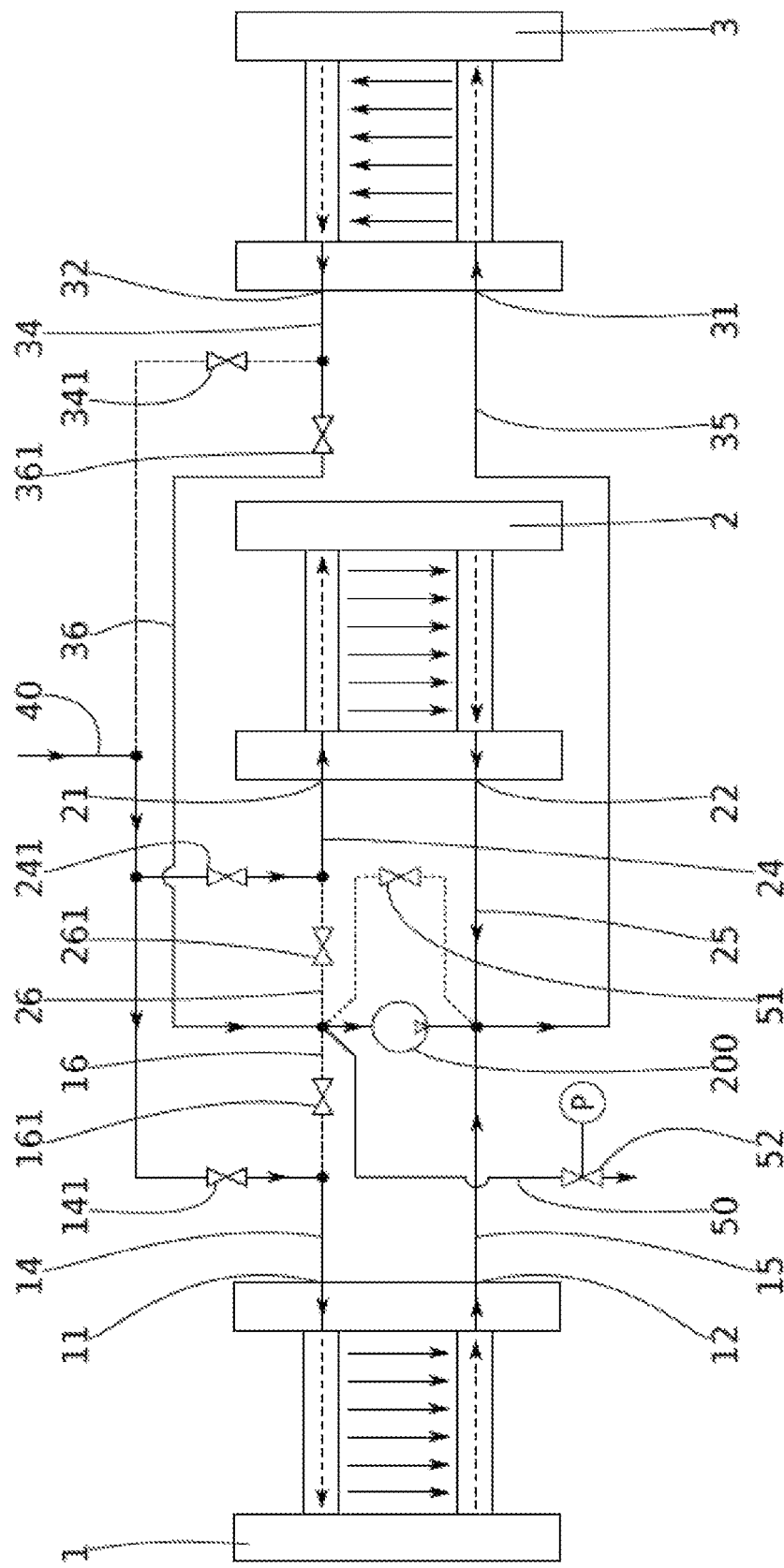
FIG. 8 schematically illustrates a fuel cell comprising three groups, a third group from among the three groups being in the regeneration phase, according to an embodiment of the present invention.
Figure 9:
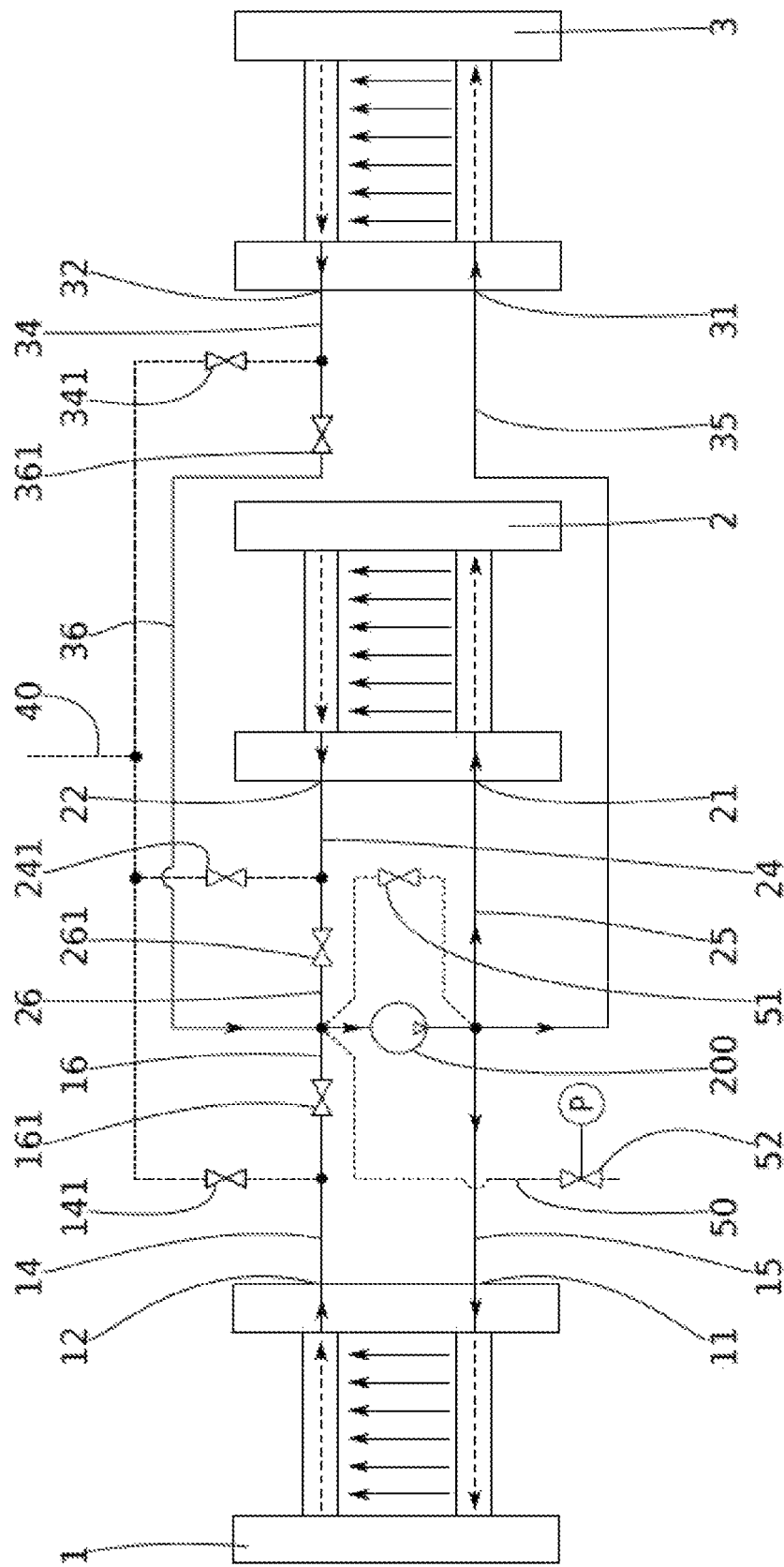
FIG. 9 schematically illustrates a fuel cell comprising three groups in the stop phase, according to an embodiment of the present invention.

FIG. 5 illustrates an operation of this fuel cell during a nominal production phase. FIGS. 6A, 6B illustrate an operation of this fuel cell during a regeneration phase of the group 1, in two opposite circulation directions in the group 1. FIG. 7 illustrates an operation of this fuel cell during a regeneration phase of the group 2. FIG. 8 illustrates an operation of this fuel cell during a regeneration phase of the group 3. FIG. 9 illustrates an operation of this fuel cell during a stop phase.

As illustrated in FIG. 5, during a nominal production phase, all the groups 1, 2, 3 are supplied in parallel, simultaneously. Thus, the air entering into the fuel cell is brought by the main supply conduit 40 and distributed to the inlet 11 of the group 1, to the inlet 21 of the group 2, and to the inlet 31 of the group 3. The inlet switches 141, 241, 341 are open. The air circulates in each supply line 14, 24, 34 to the respective inlets 11, 21, 31 of the groups 1, 2, 3. After having passed through the groups 1, 2, 3, the air exits through the respective outlets 12, 22, 32 and circulates in each discharge line 15, 25, 35 to the main discharge conduit 50. The outlet switches 51, 52 are open. The recirculation switches 161, 261, 361 are closed, such that the air does not circulate in the recirculation lines 16, 26, 36. This operating phase corresponds to the nominal operation of the fuel cell in the absence of regeneration of performances.

As illustrated in FIG. 6A, the group 1 is in the process of regeneration and the groups 2 and 3 are in the process of nominal production. In this example, the air entering into the fuel cell 100 is brought by the main supply conduit 40 to the inlet 21 of the group 2 and to the inlet 31 of the group 3. The inlet switch 141 of the group 1 is closed. The inlet switches 241, 341 are open. The air circulates in the supply lines 24, 34 to the inlets 21, 31. After having passed through the groups 2 and 3 in parallel, the air exits through the respective outlets 22, 32 and circulates in the discharge lines 25, 35 to the inlet 11 of the group 1. The group 1 is thus supplied by oxygen-depleted air coming from the outlet 22 of the group 2 and from the outlet 32 of the group 3. This air has, for example, a molar fraction of $O_2$ of around 11.7% at the outlet of the groups 2 and 3.

To decrease even further the molar fraction of oxygen of the air supplying the group 1 in the regeneration phase, the air exiting from the group 1 through the outlet 12 is advantageously partially reinjected into the group 1 through the inlet 11 via the recirculation line 16. The recirculation switch 161 is, in this case, open, while the recirculation switches 261, 361 are closed. The outlet switch 51 is closed in order to avoid a bypass of the pump 200. Some of the air circulating in the recirculation line 16 is discharged via the main discharge conduit 50 and the pressure regulator 52.

FIG. 6B illustrates a variant of regeneration of the group 1, wherein the circulation direction of the air at the group 1 is inverted with respect to the case illustrated in FIG. 6A. This is typically done by inversion of the circulation direction at the recirculation pump 200. The inlet 11 and the outlet 21 are inverted with respect to the preceding example. Except for the circulation direction, the operation, in this case, remains identical to that of the preceding example.

FIG. 7 illustrates a regeneration phase of the group 2, while the groups 1 and 3 are in the nominal production phase. In this example, the air entering into the fuel cell 100 is brought by the main supply conduit 40 to the inlet 11 of the group 1 and to the inlet 31 of the group 3. The inlet switch 241 of the group 2 is closed. The inlet switches 141, 341 are open. The air circulates in the supply lines 14, 34 to the inlets 11, 31. After having passed through the groups 1 and 3 in parallel, the air exits through the respective outlets 12, 32 and circulates in the discharge lines 15, 35 to the inlet 21 of the group 2. The group 2 is thus supplied by oxygen-depleted air coming from the outlet 12 of the group 1 and the outlet 32 of the group 3. This air has, for example, a molar fraction of $O_2$ of around 11.7% at the outlet of the groups 1 and 3.

To decrease even further the molar fraction of oxygen of the air supplying the group 2 in the regeneration phase, the air exiting from the group 2 through the outlet 22 is advantageously partially reinjected into the group 2 through the inlet 11 via the recirculation line 26. The recirculation switch 261 is, in this case, open, while the recirculation switches 161, 361 are closed. The outlet switch 51 is closed in order to avoid a bypass of the pump 200. Some of the air circulating in the recirculation line 26 is discharged via the main discharge conduit 50 and the pressure regulator 52.

A similar regeneration phase of the group 3 is illustrated in FIG. 8. In this example, the air entering into the fuel cell 100 is brought by the main supply conduit 40 to the inlet 11 of the group 1 and to the inlet 21 of the group 2. The groups 1 and 2 are thus in the nominal production phase. The inlet switch 341 of the group 3 is closed. The inlet switches 141, 241 are open. The air circulates in the supply lines 14, 24 to the inlets 11, 21. After having passed through the groups 1 and 2 in parallel, the air exits through the respective outlets 12, 22 and circulates in the discharge lines 15, 25 to the inlet 31 of the group 3. The group 3 is thus supplied by oxygen-depleted air coming from the outlet 12 of the group 1 and from the outlet 22 of the group 2. This air has, for example, a molar fraction of $O_2$ of around 11.7% at the outlet of the groups 1 and 2.

To decrease even further the molar fraction of oxygen of the air supplying the group 3 in the regeneration phase, the air exiting from the group 3 through the outlet 32 is advantageously partially reinjected into the group 3 through the inlet 31 via the recirculation line 36. The recirculation switch 361 is, in this case, open, while the recirculation switches 161, 261 are closed. The outlet switch 51 is closed in order to avoid a bypass of the pump 200. Some of the air circulating in the recirculation line 36 is discharged via the main discharge conduit 50 and the pressure regulator 52.

The recirculation pump 200 is preferably common to the recirculation lines 16, 26, 36.

The characteristics, effects and advantages of the regeneration of the groups described above in the scope of the first example are fully transposable to this second example and are not therefore repeated here, for brevity. Thus, the characteristics not described in this example of a three-group fuel cell are considered identical to those described in the example of a two-group fuel cell.

FIG. 9 illustrates a stop phase of the fuel cell 100. The air supply is cut off at the main supply conduit 40. The inlet switches 141, 241, 341 are closed. The recirculation pump 200 enables the air to circulate in each recirculation line 16, 26, 36, so as to supply the groups 1, 2 and 3 by recirculation. The recirculation switches 161, 261, 361 are open. The outlet switches 51, 52 are closed. This stop phase thus operates in a quasi-closed circuit.

This operation without new air intake on all of the groups enables to very highly deplete the air in oxygen and to quickly lower the voltage at the terminals of the cathodes of the groups of cells, while discharging the liquid water.

The phases of nominal production, regeneration of a group, stop of the fuel cell are advantageously controlled by a control/command system (not illustrated).

The regeneration system and method advantageously enabling to temporarily tilt performance in a regeneration phase for one or more groups, when the performances of the fuel cell (or of one or more groups) decrease, due to reversible degradations, or during a moderate electrical production phase, on the request of the control/command system, for example.

The invention is not limited to the embodiments described above.

The invention claimed is:

1. A fuel cell, comprising:
   a first group of electrochemical cells and a second coup of electrochemical cells, each having an inlet and an outlet capable of receiving a fluid, and
   a fluid circuit configured to guide the fluid and composing, for each group of electrochemical cells:
   (i) a fluid supply line connected to the inlet of a respective group of electrochemical cells, the fluid supply line comprising an inlet switch configured to enable or block a flow of the fluid,
   (ii) a fluid discharge line connected to the outlet of the respective group of electrochemical cells,
   (iii) a recirculation line configured to fluidically connect the inlet and the outlet of the respective group of electrochemical cells, the recirculation line comprising a recirculation switch configured to enable or block the flow of the fluid,
   wherein each fluid supply line (i) is connected to a main supply conduit common to the groups and each fluid discharge line (ii) is connected to a main discharge conduit common to the groups, the main discharge conduit comprising an outlet switch configured to enable or block the flow of the fluid,
   wherein the inlet, outlet, and recirculation switches of the fluid circuit are configured to enable, during a regeneration phase of the respective group of electrochemical cells, a supply of the respective group of electrochemical cells from a recirculation line (iii) of the respective group of electrochemical cells and from a fluid discharge line (ii) of at least one other group of electrochemical cells,
   wherein the fuel cell is configured such that the fluid has a first flow direction in the respective group of electrochemical cells dining the regeneration phase of the respective group of electrochemical cells, and
   wherein the fuel cell is configured such that the fluid has a second flow direction in the respective group of electrochemical cells during a nominal production phase of the respective group of electrochemical cells,
   wherein the first flow direction is opposite the second flow direction, and
   wherein the nominal production phase is separate from the regeneration phase.

2. The fuel cell of claim 1, wherein the recirculation line (iii) of a group of electrochemical cells comprises a common section with the recirculation line (iii) of at least one other group of electrochemical cells.

3. The fuel cell of claim 1, wherein the fluid circuit further comprises a recirculation pump common to each recirculation line (iii) of the fluid circuit,
   wherein the recirculation pump is configured to maintain, in the respective group of electrochemical cells during the regeneration phase, a fluid flow rate greater than or equal to 50%, of a nominal flow rate measured in the main supply conduit.

4. The fuel cell of claim 3, wherein the recirculation pump is confirmed to enable an inversion of a flow direction of the fluid in the respective group of electrochemical cells.

5. The fuel cell of claim 1, further comprising:
   a control/command system configured to command the inlet, outlet, and recirculation switches of the fluid circuit so as to enable or block the flow of the fluid along a chosen fluid path.

6. The fuel cell of claim 1, further comprising:
   a third group of electrochemical cells,
   wherein, during the regeneration phase of the respective group of electrochemical cells, the supply of the respective group of electrochemical cells is done from the recirculation line (iii) of the respective group of electrochemical cells and from fluid discharge lines (ii) of the other groups of electrochemical cells of the fuel cell.

7. A method for regenerating the fuel cell of claim 1, the method comprising:
   supplying the fuel cell by the main supply conduit by a fluid having a nominal flow rate and a nominal molar fraction of combustion agent; and
   during the regeneration phase of the respective group of electrochemical cells:
   switching the inlet, outlet, and recirculation switch of the fluid circuit so as to supply the respective group of electrochemical cells from the recirculation line (iii) of the respective group of electrochemical cells and from the fluid discharge line (ii) of the at least one other group of electrochemical cells,
   applying a regeneration voltage Ve to the cells of the respective group of electrochemical cells, Ve being less than or equal to 0.3V.

8. The method of claim 7, wherein the regeneration phase is configured, such that a molar fraction of combustion agent in the fluid circulating through the respective group of electrochemical cells is less than or equal to 50% of the nominal molar fraction of combustion agent.

9. The method of claim 7, wherein the fluid circulating through the respective of electrochemical cells has a flow rate greater than or equal to 50% of the nominal flow rate.

10. The method of claim 7, wherein the regeneration is earned out for a duration less than or equal to 10 s.

11. The method of claim 7, wherein the regeneration phase is carried out alternatively on each group of electrochemical cells of the fuel cell.

12. The method of claim 7, wherein the regeneration phase comprises an inversion of the flow direction of the fluid in the respective group of electrochemical cells.

13. The method of claim 7, wherein the regeneration phase is carried out when the fuel cell does not need to operate in the nominal production phase.

14. The method according to claim 7, wherein the fuel cell comprises the first, the second, and third group of electrochemical cells, and wherein the regeneration phase is carried out simultaneously on the respective group of electrochemical cells and on at least one other group.

15. The method of claim 7, wherein at least one group of electrochemical cells of the fuel cell is in the nominal production phase during the regeneration phase of at least one given group of electrochemical cells.

16. The method of claim 7, wherein the fluid circulating through the respective group of electrochemical cells has a flow rate greater than or equal to 80% of the nominal flow rate.

17. The method of claim 7, wherein the regeneration phase is carried out when an electrical production requested to the fuel cell is less than a nominal electrical production of the fuel cell.

18. The fuel cell of claim 1, configured such that, during the regeneration phase, the first flow direction is inverted through the respective group of electrochemical cells with respect to the second flow direction during the nominal production phase of the respective group of electrochemical cells.

19. The method of claim 7, comprising, during the regeneration phase, inverting the first flow direction through the respective group of electrochemical cells with respect to and the second flow direction during the nominal production phase of the respective group of electrochemical cells.

20. The fuel cell of claim 1, wherein the recirculation line (iii) comprises a recirculation pump configured to invert of a circulation direction of air in the respective group of electrochemical cells.

* * * * *